United States Patent
Kapis et al.

(10) Patent No.: US 8,556,165 B2
(45) Date of Patent: Oct. 15, 2013

(54) METHOD AND SYSTEM FOR ENABLING TELLER PRESENTATION OF PRE-APPROVED CREDIT OFFERS

(75) Inventors: Jeffrey R. Kapis, Chandler, AZ (US); Andrew W. Collins, Charlotte, NC (US); Steffanie R. Gaus, Jacksonville, FL (US); Naseem I. Khan, Stone Mountain, GA (US)

(73) Assignee: Bank of America Corporation, Charlotte, NC (US)

( * ) Notice: Subject to any disclaimer, the term of this patent is extended or adjusted under 35 U.S.C. 154(b) by 851 days.

(21) Appl. No.: 11/381,817

(22) Filed: May 5, 2006

(65) Prior Publication Data

US 2007/0063018 A1 Mar. 22, 2007

Related U.S. Application Data (60) Provisional application No. 60/719,064, filed on Sep. 21, 2005.

(51) Int. Cl.
*G06Q 40/00* (2012.01)
(52) U.S. Cl.
USPC .............................. 235/379; 705/38; 705/35
(58) Field of Classification Search
USPC .................. 235/379, 380, 383; 705/35, 38
See application file for complete search history.

(56) References Cited

U.S. PATENT DOCUMENTS

| | | | | |
|---|---|---|---|---|
| 5,619,558 A | * | 4/1997 | Jheeta | 379/92.01 |
| 5,878,403 A | * | 3/1999 | DeFrancesco et al. | 705/38 |
| 6,088,686 A | * | 7/2000 | Walker et al. | 705/38 |
| 6,829,597 B1 | * | 12/2004 | Schaeck et al. | 705/67 |
| 7,039,600 B1 | * | 5/2006 | Meek et al. | 705/14 |
| 7,555,459 B2 | * | 6/2009 | Dhar et al. | 705/38 |
| 7,742,980 B1 | * | 6/2010 | Klein | 705/38 |
| 8,036,941 B2 | * | 10/2011 | Bennett et al. | 705/26.1 |
| 2002/0004781 A1 | * | 1/2002 | Forsyth | 705/39 |
| 2002/0007341 A1 | * | 1/2002 | Lent et al. | 705/38 |
| 2002/0040339 A1 | * | 4/2002 | Dhar et al. | 705/38 |
| 2002/0147679 A1 | * | 10/2002 | Tardif | 705/39 |
| 2003/0078877 A1 | * | 4/2003 | Beirne et al. | 705/38 |
| 2006/0060647 A1 | * | 3/2006 | Vergara et al. | 235/379 |

* cited by examiner

*Primary Examiner* — Daniel Hess
(74) *Attorney, Agent, or Firm* — Michael A. Springs; Moore & Van Allen PLLC; Padowithz Alce (57) ABSTRACT

Method and System for Enabling Teller Presentation of Pre-Approved Credit Offers. Simultaneously with a teller transaction flow, pertinent customer information can be parsed and forwarded to a credit opportunity system such as may be operated by a credit bureau. If the customer qualifies, the appropriate details of the pre-approved credit offer can then returned to the teller system. The teller then has both a cue and the necessary information to sell a pre-approved product to the customer. Provisions can be made to dispose of the transaction in various ways, based on input by the teller as to the outcome of the offer to the customer. A server and other functionality disposed in a channel technology mid-tier can control the formatting and sending of offer inquiries.

28 Claims, 7 Drawing Sheets

METHOD AND SYSTEM FOR ENABLING TELLER PRESENTATION OF PRE-APPROVED CREDIT OFFERS

CROSS-REFERENCE TO RELATED APPLICATION

This application claims priority from Provision Patent Application Ser. No. 60/719,064, filed Sep. 21, 2005, the entire disclosure of which is incorporated herein by reference.

BACKGROUND

Financial institutions typically operate branch offices staffed by tellers who are available to carry out transactions for customers. These tellers use computerized systems to access the appropriate account databases and direct and regulate the flow of transactions. Teller systems traditionally send account and transaction information linearly to a transaction authorization host system, and the authorization is passed back from the host system to the teller system, where a receipt is printed.

Some financial institutions encourage or require tellers to probe customers for additional sales opportunities while a customer is "at the window" for a transaction. The ability of the teller to be effective in this endeavor may be limited by the lack of detailed information about the customer's qualifications. However, if a customer expresses interest in whatever the teller is offering, the customer can be referred to a sales associate, loan officer, or the like to discuss the opportunity with the customer in more detail, as well as, in the case of a credit product, determine the customer's qualifications.

SUMMARY

Embodiments of the present invention include the capability to, simultaneously with a teller transaction flow, parse out pertinent customer information and forward that information to a credit opportunity system such as may be operated by a credit bureau. The credit opportunity system can then determine if the customer qualifies for a loan product such as a credit card account. If the customer qualifies, the appropriate details of the pre-approved credit offer are then returned to the teller system. The teller then has a cue to sell a pre-approved product to the customer.

In some embodiments, such a transaction begins with enabling a teller transaction for a customer in the normal fashion. A credit offer inquiry can then be simultaneously and asynchronously made to a credit opportunity service using information about the customer determined in the course of the teller transaction. When a pre-approved offer can be made, the offer is provided to the teller to enable presentation to the customer. In some embodiments, the credit offer inquiry is formatted in extensible markup language (XML) for use by the credit opportunity service, and the XML file is sent to the service via hypertext transmission protocol (HTTP). The formatting can be accomplished by a software agent for an offer server disposed in a channel technology mid-tier, and the interaction with the teller can be through an offer client in a teller platform.

Optionally, in some embodiments, business exclusion rules are applied to the customer's information prior to sending an offer inquiry to the service. For example, such rules may be set up by the financial institution to prevent offers from being made to certain types of customers. Also optionally, provisions can be made to dispose of the transaction in various ways, based on input by the teller as to the outcome of the offer to the customer. For example, if the teller indicates that the offer is accepted, a booking process can be initiated to set-up the credit account according to the terms of the offer. If the teller indicates the customer is undecided, the customer can be referred to a sales associate, or a letter confirming the offer can be sent to the customer. In most cases, if the customer declines the offer, the transaction can be ended.

As previously mentioned, a system for implementing an embodiment of the invention can include a teller platform with a desktop client and a credit offer client. The transaction can be managed by an offer server, with appropriate data translation by a software agent. A Web proxy server can provide connectivity over which offer inquires are transmitted to a credit opportunity service over in a secured fashion. The offer server can reside in a channel technology mid-tier. In at least some embodiments, the means to implement the invention include various standard computing platforms running computer program instructions and appropriately networked together as is known in the art.

DETAILED DESCRIPTION OF THE INVENTION

The present invention will now be described in terms of specific example embodiments. It is to be understood that the invention is not limited to the example embodiments disclosed. It should also be understood that not every feature of the methods and systems described is necessary to implement the invention as claimed in any one of the amended claims. Also, throughout this disclosure, where a process or method is shown or described, the steps of the method may be performed in any order or simultaneously, unless it is clear from the context that one step depends on another being performed first. Additionally, there can be significant time lag between steps.

It may be helpful for the reader to understand some definitions of terms from this point forward. Other terms are intended to have their ordinary meaning within the relevant art, or will be defined when first introduced. It should be understood that terms like "teller" and "financial institution" as well as terms like "bank" are used herein in their broadest sense. Institutions, organizations, incorporations that maintain various types of financial accounts are widely varied in their organization and structure, as well as are the accounts themselves. These terms are intended to encompass all possibilities, including but not limited to finance companies, stock brokerages, credit card companies, telephone companies, mortgage companies, manufacturers who provide financial services associated with the purchase of goods, etc. Persons who may be called "tellers" in one type of institution may have a different name in another type of institution even though such persons are functionally equivalent to what a bank would call a teller. Likewise, credit accounts can take many forms beyond the typical credit card type of account envisioned by most people when one uses the term "pre-approved" as that term is used herein.

Mention is made throughout this disclosure of a "credit opportunity service." One example of such a service is Zoot Enterprises, Inc., a subsidiary of the credit bureau known as "Equifax." Such services, among other things, provide prequalification credit decisioning for financial institutions. However, it should be noted that the use of the term "credit opportunity service" is not intended to have the limited meaning of a service that is external to a financial institution. For example, a financial institution may operate its own credit opportunity service, which may even simply consist of a database in which credit opportunities can be listed and found, or some other simple algorithm or functionality to provide such offers to a bank's customers. With any of these options, a "credit offer inquiry" is the data which is sent to a credit opportunity service to inquire as to whether a pre-approved offer can be made to a customer. In such a case, if a pre-approved offer exists, a response to the inquiry can consist of the details of the offer, which herein may be simply referred to as the "pre-approved credit offer."

Embodiments of the present invention provide an opportunity to offer real time, pre-approved credit to customers in the most populous channel of a financial institution. Such capability can be an effective tool to acquiring new credit business, deepening existing relationships, enhancing customer satisfaction, and improving morale among employees of the institution, such as the tellers. Systems and methods according to embodiments of the invention enable this capability by providing asynchronous inquiries and processing of responses involving the teller system and other transaction systems within the financial institution, and a credit opportunity service, such as one run by a credit bureau. In some embodiments, the teller system can initiate the booking of a new account based on the pre-approved credit offer, without having to engage another associate in the financial institution, such as a credit card manager, loan officer, etc.

Figures 1, 1A:
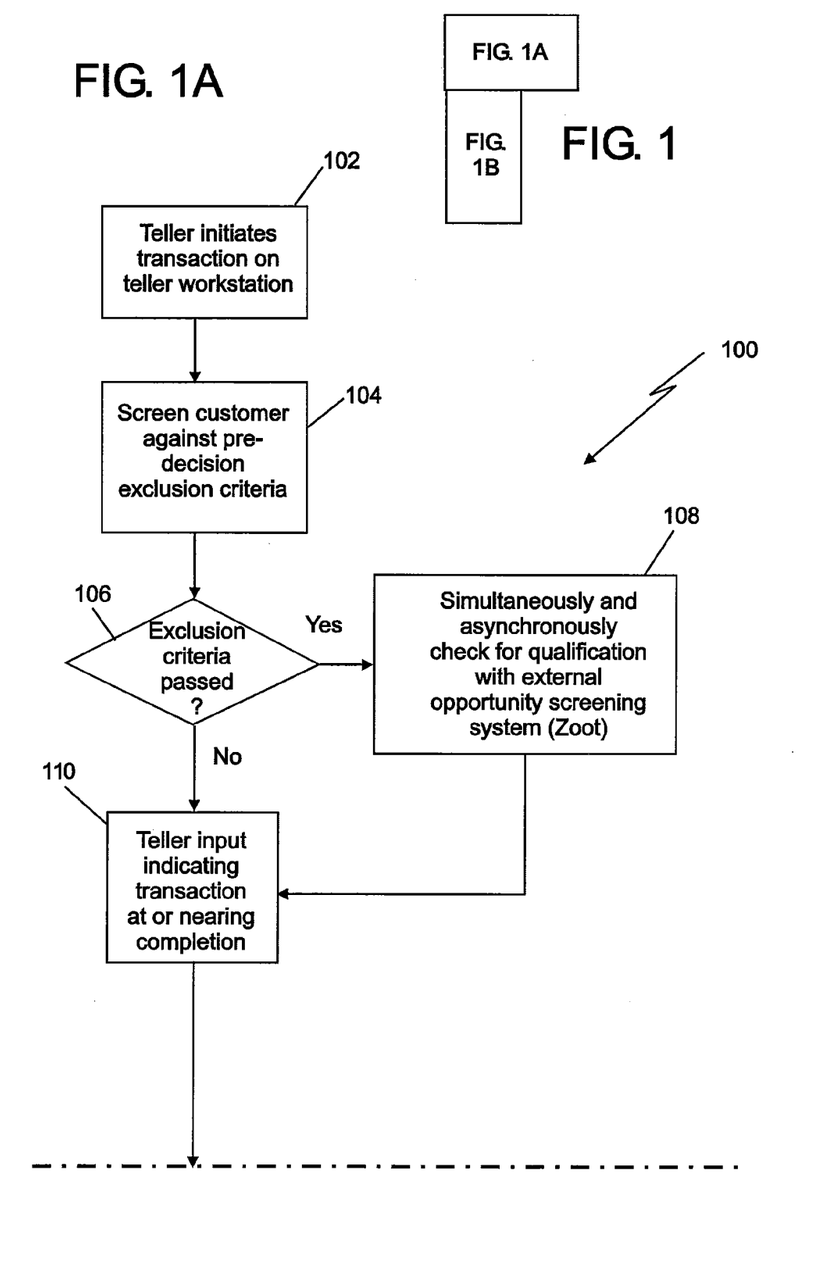
FIG. 1 is a flowchart illustrating the overall method of embodiments of the invention.
Figure 1B:
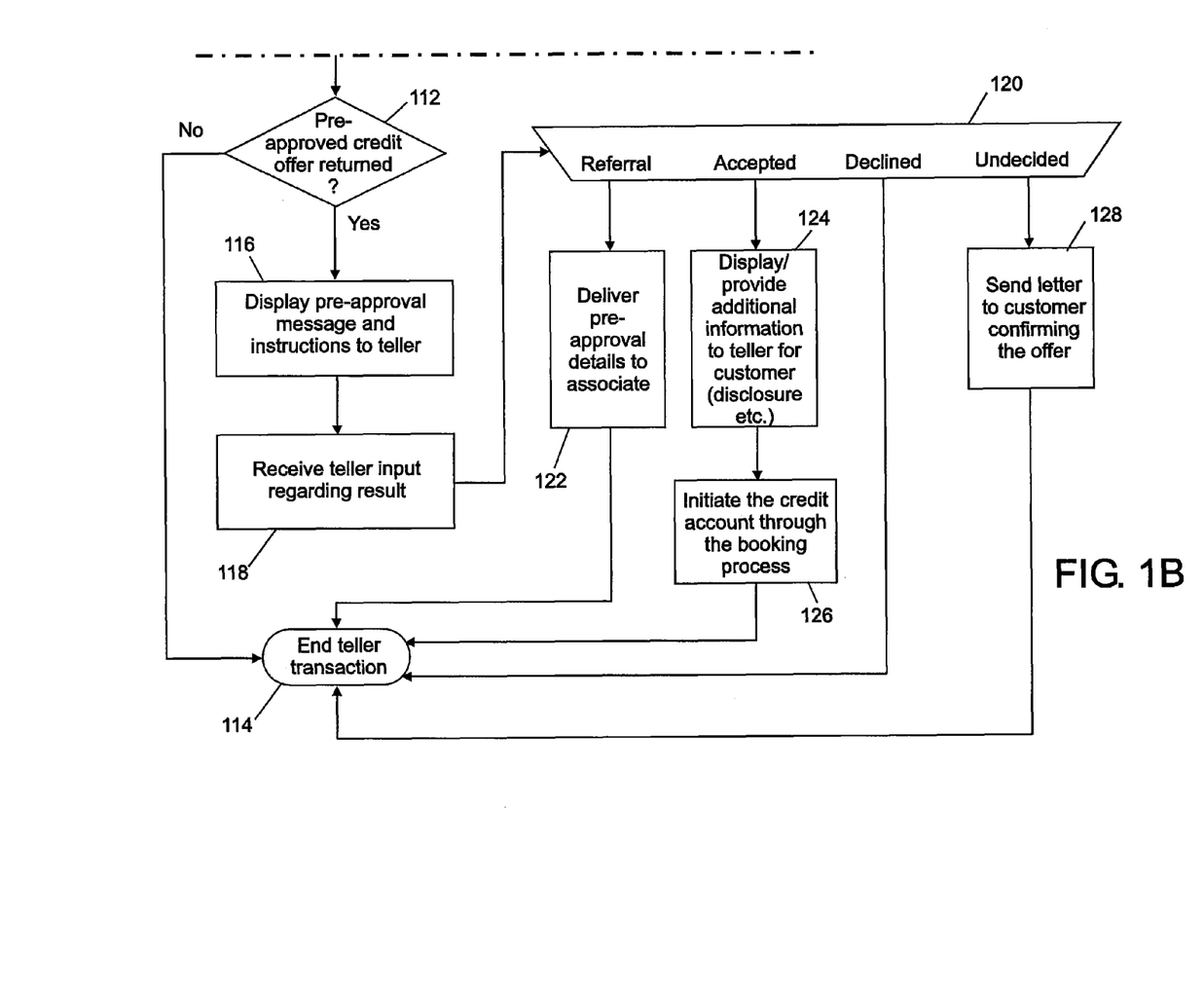
Figures 2, 2A:
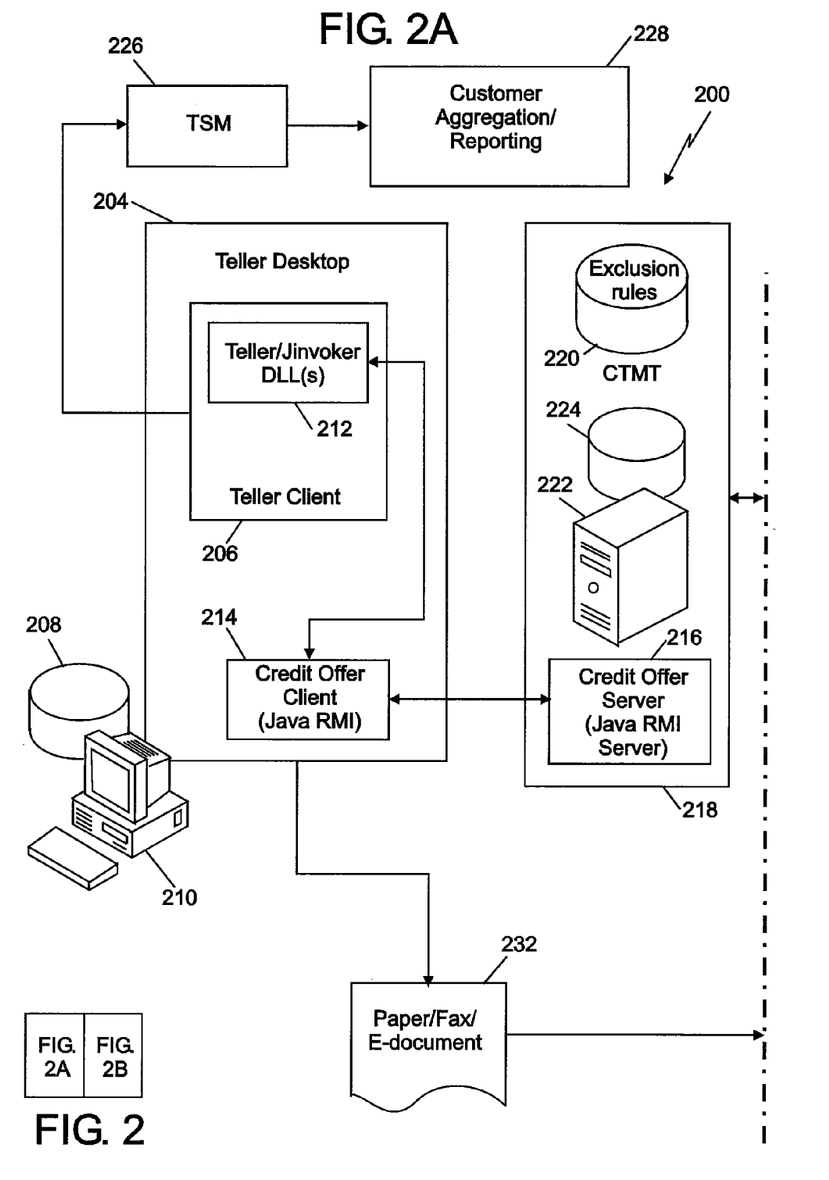
FIG. 2 is a system block diagram showing the system and operating environment according to some embodiments of the invention.
Figure 2B:
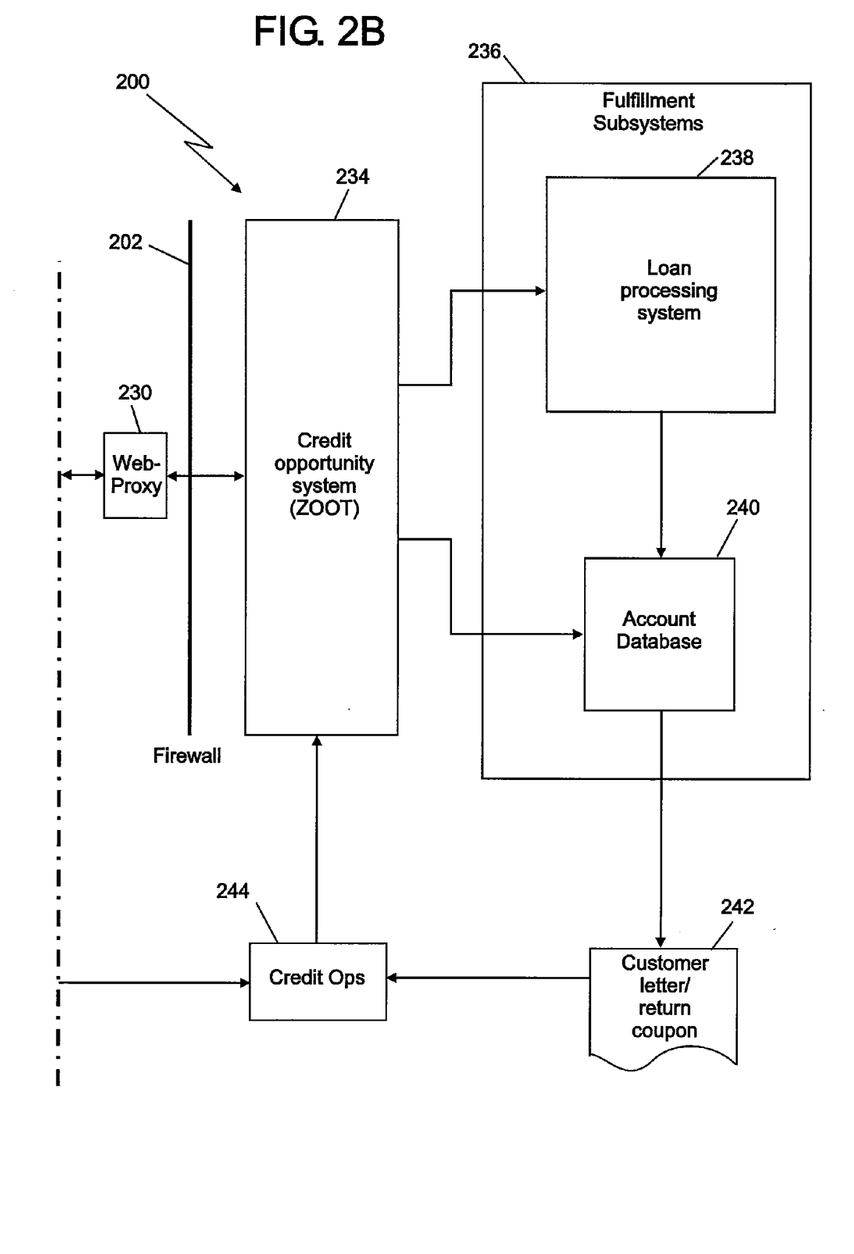
Figure 3:
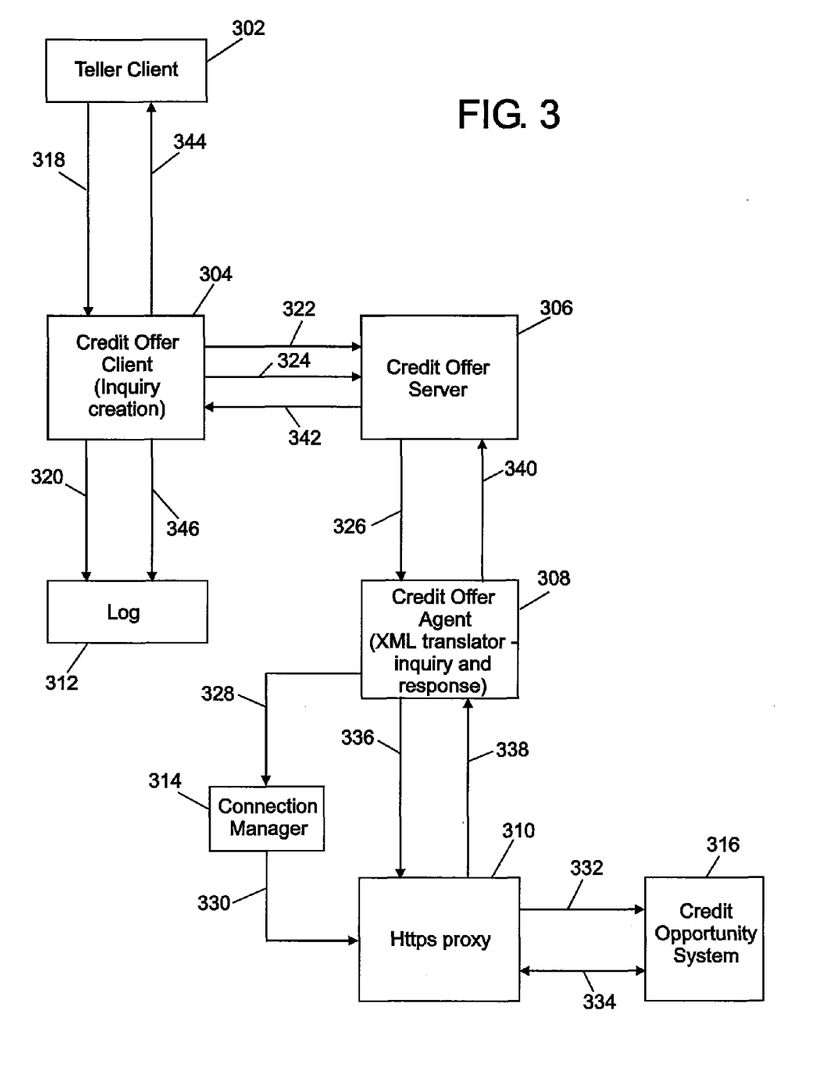
FIGS. 3-5 are combination block and flow diagrams illustrating details of the operation of example embodiments of the invention.
Figure 4:
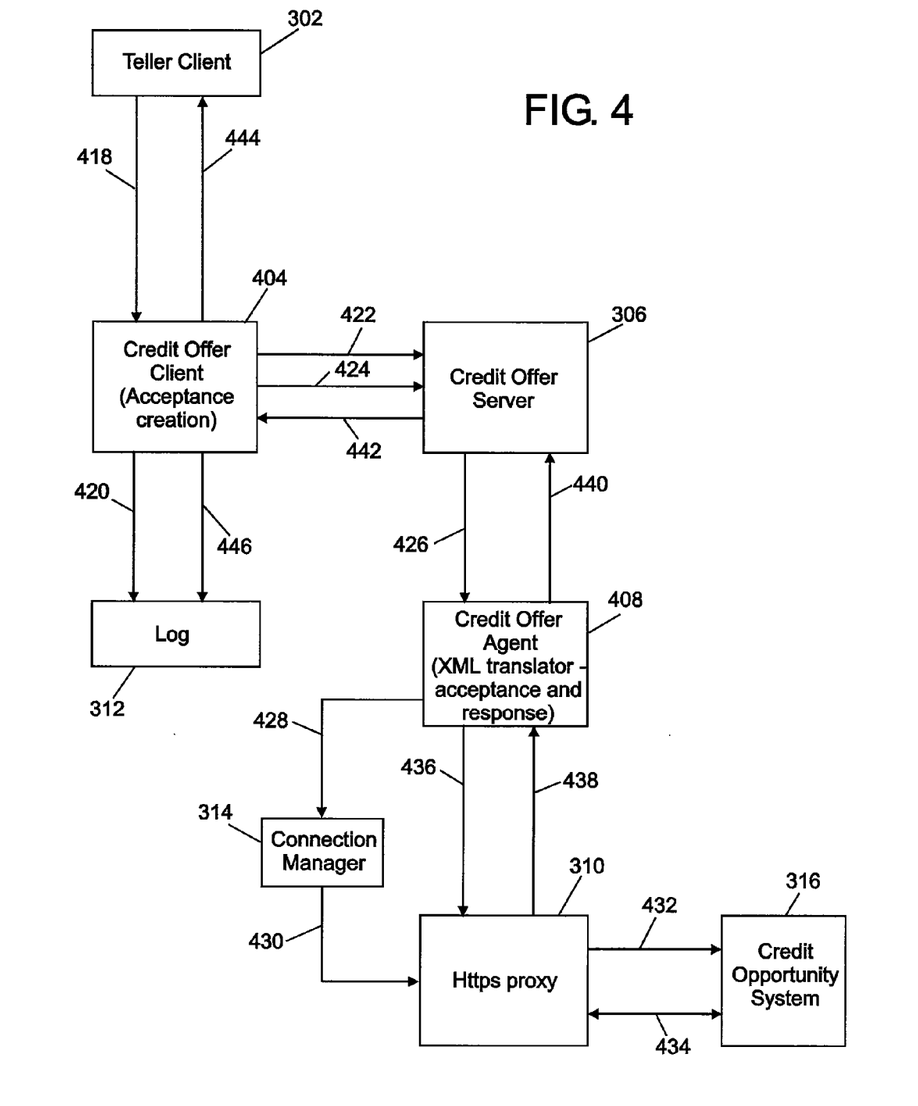
Figure 5:
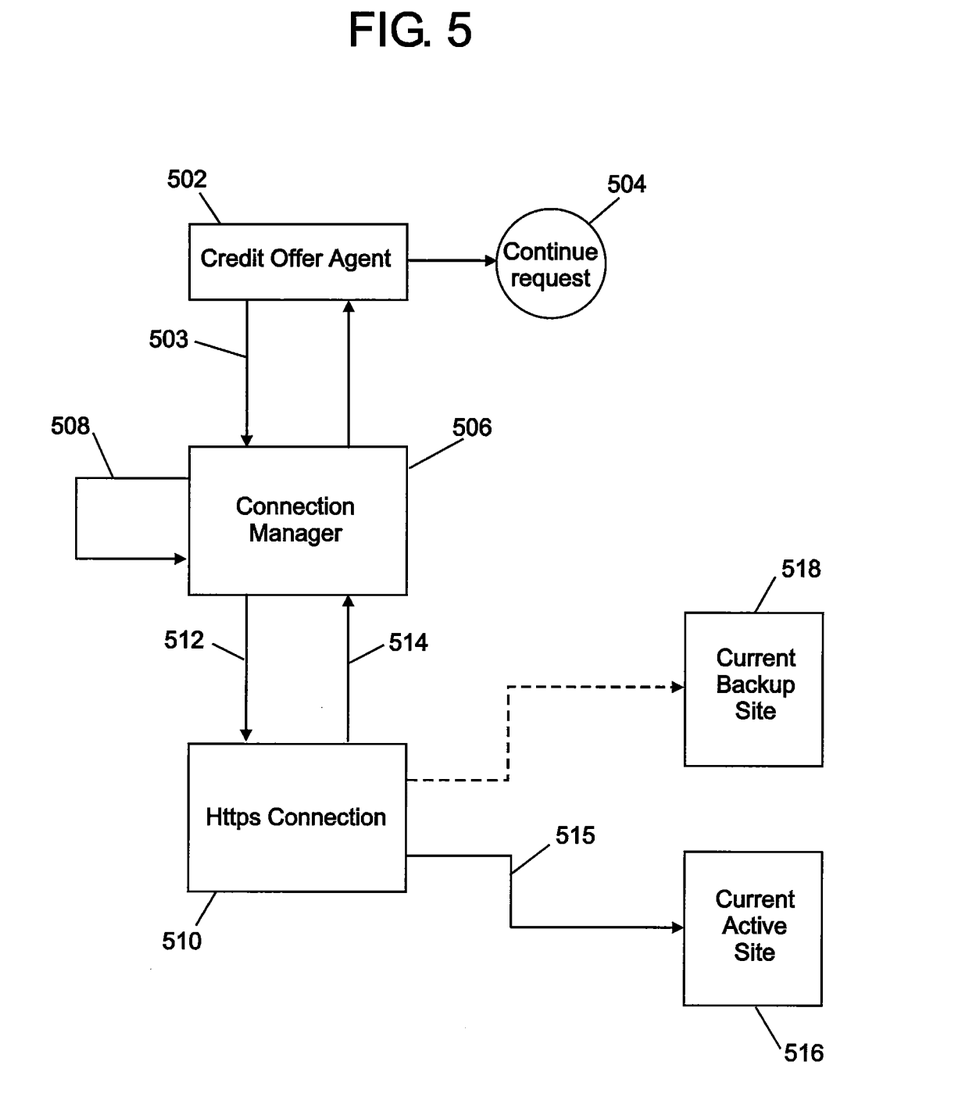

FIGS. 1 and 2 of the accompanying drawings provide a high level view of the method and system of example embodiments of the invention. FIGS. 3, 4, and 5 provide further details of how credit offer inquiries and responses are processed as they are sent to or received from, as the case may be, a credit opportunity service. For clarity, some details are not shown in the drawings, but are rather described herein.

FIG. 1 is a flowchart illustrating a high level view of the process, 100, according to example embodiments of the invention. As is typical with flowchart diagrams, the process is illustrated as a series of process or sub-process blocks. At block 102, the teller initiates a transaction on a teller workstation. In a typical environment, a customer approaches the teller and the teller identifies and authenticates the customer in order to perform a normal transaction such as a deposit, withdrawal, or transfer. With embodiments of the present invention, this action initiates the method of enabling the teller to present a pre-approved credit offer to the customer. At block 104, in some embodiments, the customer is pre-screened against business exclusion criteria. At block 106, a determination is made as to whether the customer has passed all of the exclusion criteria. If so, at block 108, the system simultaneously and asynchronously checks for pre-qualified offers with, in this embodiment, an external opportunity screening system. For example, the previously mentioned Zoot Enterprises can be used. In either case, process 100 continues with the teller performing the normal task of handling a teller transaction. At some point in the transaction, represented by block 110, teller input will indicate the transaction is at or nearing completion. If pre-screened offers can be received faster, this logical point of the process could be reached earlier in the teller transaction. Exactly what triggers the check for pre-approved credit offers and when the teller is prompted is a design decision that is easily within the skills of practitioners in the art.

Still referring to FIG. 1, at block 112, a determination is made as to whether a pre-approved credit offer has been returned. If not, the teller process ends at block 114. This lack of a pre-approved credit offer can either be because no offers were returned by the credit opportunity system, or because the customer was excluded based on the exclusion criteria. However, if a pre-approved offer is returned, processing continues to block 116 where a pre-approval message and instructions are displayed to the teller on a teller platform workstation. At this point the teller can discuss the offer to the customer with knowledge of the details of the pre-approved offer. With appropriate training, the tellers can use intelligent questions and appropriate statements to refer to credit products offered by the financial institution. Obviously, the amount of time for this interaction with the customer can vary significantly. At block 118, the teller inputs the result of the interchange with the customer into the teller platform.

It should be always kept in mind that process 100 of FIG. 1 is an example only. A system can be devised to allow various types of teller input that leads to various processes being initiated within the enterprise. In the example of FIG. 1, the teller indicates one of four outcomes, either that a referral to an associate to obtain more information is desired, that the offer is accepted, that the offer is declined, or that the customer is undecided. Block 120 of FIG. 1 represents these four possibilities. It should be assumed that in most cases the teller would be educated as to when to enter these various responses. For example, if the customer leaves before expressing his or her interest, the teller might be instructed to indicate that the customer is undecided. In the example embodiment of FIG. 1, if a referral is desired, the details can be automatically sent to an appropriate associate at the enterprise at block 122. The teller process then ends at block 114. If the offer is accepted, additional information can be displayed or provided in printed form to the teller in an automated fashion at block 124. This can include appropriate disclosure forms, signature papers, etc. The credit account can then be initiated through the normal booking process at block 126. If the teller indicates the customer is undecided, a letter can be sent to the customer confirming the offer at block 128. Finally, if the teller indicates that the offer was declined, the process simply ends at block 114.

FIG. 2 presents a system block diagram illustrating the operating environment and functional elements of a system according to example embodiments of the invention. System 200, the various components of which implement embodiments of the invention, is disposed on the left side, or inside, of firewall 202. The functionality on the right hand side of firewall 202 in an installation following this example will be outside of the financial institution or enterprise implementing the invention, although this will not necessarily be the case in all embodiments. Teller desktop platform 204 includes a workstation, printer, and other input devices as might be needed at a typical financial institution. Such a setup typically includes teller client software, 206, as well as other software elements which are omitted for clarity. As is known in the art, these elements often consist at least partially of computer program products residing on a media such as media 208, and operation is controlled by a workstation such as workstation 210. In this example embodiment, the invention is implemented using JAVA remote method invocation (RMI), as is known in the art. Thus, a jinvoker dynamically linked library (DLL), 212, is disposed in a credit offer client, 214. This client communicates with a credit offer server, 216, which operates in a channel technology mid-tier (CTMT), 218. This server also has access to a database of business exclusion rules, 220. The necessary resources residing in the CTMT to carry out the invention typically reside in servers such as server 222 and can take the form of computer program product residing on media, such as medium 224. In this example embodiment, system 200 also includes a Windows 2000 or Windows NT technical services manager (TSM), 226, which provides reporting of transactions to system 228 which keeps records of customer interactions in example embodiment of the invention. It should be noted that in example embodiments of the invention, there is also an offer agent present in the CTMT, but this has been omitted in FIG. 2 for clarity. The offer agent and its functionality will be discussed in greater detail with respect to FIGS. 3 and 4.

At this point it may be benefit the reader to digress into still further details of system 200 of FIG. 2. It should be clear however, that there are many ways to implement the invention, and the particular details disclosed here represent but a small subset of example embodiments. For example, Java RMI is used in this embodiment as previously mentioned, but the same functionality could be implemented in other ways. Remote method invocation (RMI) allows applications to call object methods located remotely, sharing resources and distributing load across various systems. Unlike other systems for remote execution which require that only simple data types or defined structures be passed to and from various software modules, RMI allows any JAVA object type to be used. RMI allows both client and server modules to dynamically load new software objects as required. Java RMI facilitates object function calls between Java virtual machines, such as one on a server and one on a client.

Any of various teller platforms can be used to implement teller desktop 204 of FIG. 2. Preexisting commercial platforms can be used, or one can be developed specifically by a financial institution or other enterprise. One example of a preexisting commercial system that could be modified is the Bankpro™ platform sold by Argo Data Resources Corporation of Dallas Tex. The channel technology mid-tier referred to above refers to middleware which forms a bridge between various systems as is known in the art. One example off-the-shelf product that can be used as the CTMT is Websphere™ marketed by the International Business Machines Corporation. Again, these details are provided by way of full disclosure of an example, and are not intended to limit embodiments of the invention to the use of these specific platforms.

Returning to FIG. 2, Web proxy 230 is provided to link the enterprise systems with a credit opportunity system, which in the example of FIG. 2 is located outside the financial institution. It is through this web proxy that credit offer inquiries are forwarded and responses are received in example embodiments of the invention. Additionally, acceptances which are recorded at the teller workstation can be forwarded through web proxy 230 to the credit opportunity system to initiate the booking process. Alternatively, when a referral is made to an associate at the financial institution, the teller desktop platform, 204, can output a document of the offer and the interaction with the customer for use by the associate as indicated schematically by paper/fax/e-document 232. In this example embodiment, credit opportunity system (for example, ZOOT, as previously discussed) 234 is used to both provide pre-approved credit offers, and initiate the booking process when offers are accepted. The booking process can be imitated by communicating with fulfillment subsystems 236, which can include a loan processing system 238, and an account database 240. It should be noted that these fulfillment subsystems are often located in a different part of the financial institution which is implementing the invention. Alternatively, contractor or vendor resources, can be used. In addition, these same fulfillment subsystems can be used when an undecided customer is sent a letter describing the pre-approved offer, as illustrated schematically by customer letter 242. Note that the associates of the financial institution, who process return coupons which may result from the customer letter, and who also field additional discussions with customers, are often part of a credit operations organization, represented by functional block 244 of FIG. 2. This organization can also book accounts automatically through credit opportunity system 234, as indicated with the connecting arrow between the two blocks in FIG. 2.

FIGS. 3, 4, and 5 are combination block and flow diagrams which illustrate the details of operation of specific example embodiments of the invention. FIG. 3 illustrates communication between teller client 302, offer client 304, offer server 306, offer agent 308, and Internet proxy 310. A logging subsystem 312, connection manager 314, and the credit opportunity system, 316 are also shown. At the beginning of the process, teller client 302 constructs a buffer consisting of fields that provide input. In example embodiments, the fields may be separated by a pipe character and may be padded with spaces as is known in the art. The buffer is passed to the offer client as indicated schematically by information flow 318. This buffer is passed in example embodiments by the jinvoker DLL. The offer client then parses the buffer into an array of strings, removing spaces as needed. In this example embodiment, the credit offer inquiry is logged in log 312 via information flow 320. A connection to the technology mid-tier and the offer server is then made at 322, and the credit offer request is passed to the credit offer server as shown by information flow 324. The offer server may edit the request to achieve appropriate content for a particular credit opportunity system. The server then invokes a credit offer agent and passes the request to the agent, 308, at information flow 326. The credit offer agent serves as an XML translator. In the present instance, it creates an in-memory XML document conforming to an XML document type definition agreed upon between the credit opportunity system and the financial institution. The agent then invokes a connection manager at 328 and the connection manager creates the secured, HTTP connection, via proxy 310, as schematically indicated at flow 330. A connection to the credit opportunity system is requested at 332, and a two way communication path is established at 334.

Still referring to FIG. 3, the agent, 308, forwards the credit offer inquiry through the HTTPS proxy as shown schematically by information flow 336. A response is received at 338. The agent creates an offer response by parsing out the XML formatted response received from the credit opportunity system through the proxy. The agent can also validate transaction ID's and other codes to make sure that the message is valid. The response is sent back to the offer server at information flow 340, and the offer server in turn returns the response to the offer client at flow 342. Finally the pre-approved credit offer is returned to the client desktop platform at flow 344. Additionally, the response can be logged by the credit offer client as indicated schematically by information flow 346.

FIG. 4 is very similar to FIG. 3, except that the flow pertains to creating and sending an acceptance to the credit opportunity system, and receiving a response. Many of the same elements are involved in the information flow as can be readily discerned by observing the like reference numbers used. At the beginning of the process, teller client 302 constructs a buffer consisting of fields that provide input. The buffer is passed to the offer client as indicated schematically by information flow 418. In this example embodiment, the credit offer acceptance is logged in log 312 via information flow 420. A connection to the technology mid-tier and the offer server is then made at 422, and the credit offer acceptance is passed to the credit offer server as shown by information flow 424. The offer server may edit the acceptance to achieve appropriate content for a particular credit opportunity system. The server then invokes a credit offer agent, 408, to handle the acceptance and passes the acceptance to the agent at information flow 426. The credit offer agent again serves as an XML translator. In the present instance, it creates an in-memory XML document conforming to an XML document type definition agreed upon between the credit opportunity system and the financial institution for the acceptance. The agent then invokes a connection manager at 428 and the connection manager creates the secured, HTTP connection, via proxy 310, as schematically indicated at flow 430. A connection to the credit opportunity system is requested at 432, and a two way communication path is established at 434.

Still referring to FIG. 4, the agent, 408, forwards the credit offer acceptance through the HTTPS proxy as shown schematically by information flow 436. A response is received at 438. The agent creates an acceptance response by parsing out the XML formatted response received from the credit opportunity system through the proxy. The agent can also validate transaction ID's and other codes to make sure that the message is valid. The response is sent back to the offer server at information flow 440, and the offer server in turn returns the response to the offer client at flow 442. The response, typically a confirmation message re-iterating details of the account being created, is returned to the client desktop platform at flow 444. Additionally, the response can be logged by the credit offer client as indicated schematically by information flow 446.

FIG. 5 illustrates information flow for the process of connecting to a credit opportunity system as managed by the connection manager previously described. The credit offer agent, 502, initiates a connection as illustrated by flow 503. The credit offer agent continuously requests a connection if one is not proffered immediately, as shown at block 504. Connection manager 506 in turn, checks whether a fail back time has elapsed. Connection manager 506 continuously tries to obtain a connection if one is not immediately proffered, as indicated at 508. A proxy connection, 510, is requested as indicated by information flow 512, and a secured connection is open at 514. The connection, 515, can be made to the credit opportunity service via the current active site, 516, or via the services backup site, 518, as indicated by the dotted arrow. In example embodiments of the invention, the offer agent, offer server, and the connection manager all reside within the channel technology mid-tier.

In example embodiments, a financial enterprise or bank implementing an embodiment of the invention can work with the credit opportunity service to determine which fields of information should be in credit offer inquiries and the subsequent XML files created as part of the process. Typically, such an inquiry would include the customer's vital information such as name, address and social security number, as well as the institution's information. It may be desirable to include average balances, and employment indicators, information identifying products of interest, and additional data that may be used to determine qualifications. Likewise, the pre-approved credit offer can include all of the above as well as APR information, FICO score, credit limit, balance transfer information, and the like. In the example embodiments, this information would be received as part of an XML file, and would be converted to a pre-approved credit offer to be supplied to the teller, and/or possibly other individuals or departments within the financial institution.

As previously mentioned, computer program instructions may be used to implement all or parts of an embodiment of the present invention. In a typical arrangement computer program products containing computer program instructions are run on various computing or instruction execution platforms. These computer program instructions may be part of a computer program or multiple computer programs which are supplied as a computer program product. In such a case the computer program product may take the form of computer readable media that allow computer instructions to be loaded into various servers or other platforms to implement the invention. In addition to being supplied in the form a machine readable medium or machine readable media, computer program instructions which implement the invention supplied over a network in this case the medium is a stream of information being retrieved when the computer program product is accessed or downloaded. Computer programs which implement embodiments of the invention can reside on any medium that can contain store communicate propagate or transport the program for use by or in connection with any instruction execution system. The medium for example may be electronic, magnetic, optical, electromagnetic, or a semiconductor system or device. A computer usable or computer readable medium could even be paper or another suitable medium on which the program is printed, as the program can then be captured or entered into a system and then processed in a suitable manner.

Specific embodiments of an invention are described herein. One of ordinary skill in the computing networking and financial information technology arts will quickly recognize that the invention has other applications and can be used in other environments. The following claims are in no way intended to limit the scope of the invention to the specific embodiments described above.

The invention claimed is:

1. A method of enabling teller presentation of a pre-approved credit offer, the method comprising:
    initiating a first banking transaction, wherein the first banking transaction involves a customer and a teller at a financial institution, wherein the first banking transaction is not a request for a loan, and wherein initiating the first banking transaction comprises:
        receiving a first information from the customer for the first banking transaction;
        receiving, at a credit offer server that is internal to the financial institution, an indication of the first banking transaction involving the customer and the teller;
    initiating, by the credit offer server that is internal to the financial institution, a second banking transaction based at least partially on the indication of the first banking transaction, wherein the second banking transaction involves at least a portion of the first information from the customer and at least the credit offer server, wherein initiating, by the credit offer server, the second banking transaction comprises:
        applying pre-decision exclusion criteria to the portion of the first information from the customer, wherein the pre-decision exclusion criteria relates to one or more business exclusion rules that when satisfied by the portion of the first information automatically triggers the credit offer server to provide said first portion of the first information to a credit opportunity server that is external to the financial institution;

using, at the credit offer server, the portion of the first information from the customer to thereby generate a second information;

providing the second information to the credit opportunity server that is external to the financial institution based at least partially on determining that the portion of the first information from the customer satisfies the pre-decision exclusion criteria;

receiving, at the financial institution from the credit opportunity server, one or more pre-approved credit offers based at least partially on a comparison of the second information to stored information, at the credit opportunity server, relating to a plurality of loans and the second information satisfying minimum criteria for eligibility for one or more of the plurality of loan products; and presenting to the customer the one or more pre-approved credit offers.

2. The method of claim 1 further comprising:

receiving input indicating a result of the presentation to the customer; and initiating at least one of:

a booking process to create a credit account at the financial institution based on the pre-approved credit offer, the booking process being initiated by the teller at the same financial institution where the teller is employed, a referral to an associate at the same financial institution where the teller is employed, and a confirmation letter to the customer from the same financial institution where the teller is employed.

3. The method of claim 2 wherein the providing the second information to the credit opportunity server comprises:

formatting the second information in extensible markup language; and sending the second information to the credit opportunity server via hypertext transmission protocol.

4. The method of claim 3 wherein the formatting is accomplished at a channel technology mid-tier.

5. The method of claim 3 wherein the second information is provided to the credit opportunity server subject to business exclusion criteria such that the business exclusion criteria is applied prior to a simultaneously and asynchronously providing the second information to the credit opportunity server.

6. The method of claim 2 wherein the second information is provided to the credit opportunity server subject to business exclusion criteria such that the business exclusion criteria is applied prior to a simultaneously and asynchronously providing the second information to the credit opportunity server.

7. The method of claim 1 wherein the providing the second information to the credit opportunity server comprises:

formatting the second information in extensible markup language; and sending the second information to the credit opportunity server via hypertext transmission protocol.

8. The method of claim 7 wherein the formatting is accomplished at a channel technology mid-tier.

9. The method of claim 7 wherein the second information is provided to the credit opportunity server subject to business exclusion criteria such that the business exclusion criteria is applied prior to a simultaneously and asynchronously providing the second information to the credit opportunity server.

10. The method of claim 1 wherein the second information is provided to the credit opportunity server subject to business exclusion criteria such that the business exclusion criteria is applied prior to the providing.

11. A computer program product for enabling teller presentation of a pre-approved credit offer, the computer program product including a non-transitory medium having a computer program residing thereon, the computer program comprising instructions for:

initiating a first banking transaction, wherein the first banking transaction involves a customer and a teller at a financial institution, wherein the first banking transaction is not a request for a loan, and wherein initiating the first banking transaction comprises:

receiving a first information from the customer for the first banking transaction;

receiving, at a credit offer server that is internal to the financial institution, an indication of the first banking transaction involving the customer and the teller;

initiating, by the credit offer server that is internal to the financial institution, a second banking transaction based at least partially on the indication of the first banking transaction, wherein the second banking transaction involves at least a portion of the first information from the customer and at least the credit offer server, wherein initiating, by the credit offer server, the second banking transaction comprises:

applying pre-decision exclusion criteria to the portion of the first information from the customer, wherein the pre-decision exclusion criteria relates to one or more business exclusion rules that when satisfied by the portion of the first information automatically triggers the credit offer server to provide said first portion of the first information to a credit opportunity server that is external to the financial institution;

using, at the credit offer server, the portion of the first information from the customer to thereby generate a second information;

providing the second information to the credit opportunity server that is external to the financial institution based at least partially on determining that the portion of the first information from the customer satisfies the pre-decision exclusion criteria;

receiving, at the financial institution from the credit opportunity server, one or more pre-approved credit offers based at least partially on a comparison of the second information to stored information, at the credit opportunity server, relating to a plurality of loans and the second information satisfying minimum criteria for eligibility for one or more of the plurality of loan products; and presenting to the customer the one or more pre-approved credit offers.

12. The computer program product of claim 11 wherein the computer program further comprises:

instructions for receiving teller input indicating a result of the presentation to the customer; and instructions for initiating at least one of a booking process to create a credit account based on the pre-approved credit offer, a referral to an associate, and a confirmation letter to the customer.

13. The computer program product of claim 12 wherein the computer program further comprises instructions for formatting the second information in extensible markup language.

14. The computer program product of claim 13 wherein the instructions for formatting are adapted to reside in channel technology mid-tier.

15. The computer program product of claim 12 wherein the computer program further comprises instructions for applying business exclusion criteria to the information about the customer.

16. The computer program product of claim 11 wherein the computer program further comprises instructions for formatting the second information in extensible markup language.

17. The computer program product of claim 16 wherein the instructions for formatting are adapted to reside in channel technology mid-tier.

18. The computer program product of claim 16 wherein the computer program further comprises instructions for applying business exclusion criteria to the information about the customer.

19. The computer program product of claim 11 wherein the computer program further comprises instructions for applying business exclusion criteria to the information about the customer.

20. Apparatus for enabling teller presentation of a pre-approved credit offer, the apparatus comprising:
a device configured to initiate a first banking transaction, wherein the first banking transaction involves a customer and a teller at a financial institution, wherein the first banking transaction is not a request for a loan, and wherein initiating the first banking transaction comprises:
receiving a first information from the customer for the first banking transaction;
a credit offer server that is internal to the financial institution that is configured to:
receive an indication of the first banking transaction involving the customer and the teller;
initiate a second banking transaction based at least partially on the indication of the first banking transaction, wherein the second banking transaction involves at least a portion of the first information from the customer and at least the credit offer server, wherein initiating, by the credit offer server, the second banking transaction comprises:
applying pre-decision exclusion criteria to the portion of the first information from the customer, wherein the pre-decision exclusion criteria relates to one or more business exclusion rules that when satisfied by the portion of the first information automatically triggers the credit offer server to provide said first portion of the first information to a credit opportunity server that is external to the financial institution;
using, at the credit offer server, the portion of the first information from the customer to thereby generate a second information; and
providing the second information to the credit opportunity server that is external to the financial institution based at least partially on determining that the portion of the first information from the customer satisfies the pre-decision exclusion criteria;
a computer processing device configured to:
receive, at the financial institution from the credit opportunity server, one or more pre-approved credit offers based at least partially on a comparison of the second information to stored information, at the credit opportunity server, relating to a plurality of loans and the second information satisfying minimum criteria for eligibility for one or more of the plurality of loan products; and
present to the customer the one or more pre-approved credit offers.

21. The apparatus of claim 20 further comprising
means for receiving teller input indicating a result of the presentation to the customer; and
means for initiating at least one of a booking process to create a credit account based on the pre-approved credit offer, a referral to an associate, and a confirmation letter to the customer.

22. The apparatus of claim 21 further comprising means for applying business exclusion criteria to information about the customer.

23. The apparatus of claim 20 further comprising means for applying business exclusion criteria to information about the customer.

24. A system for enabling teller presentation of a pre-approved credit offer, the system comprising:
a computing platform including at least one processor and a storage device;
a database comprising one or more rules relating to maintenance of information stored in an archive;
a software module stored in the storage device, comprising executable instructions that when executed by the processor cause the processor to:
initiate a first banking transaction, wherein the first banking transaction involves a customer and a teller at a financial institution, wherein the first banking transaction is not a request for a loan, and wherein initiating the first banking transaction comprises:
receiving a first information from the customer for the first banking transaction;
credit offer server that is internal to the financial institution and configured to:
receive an indication of the first banking transaction involving the customer and the teller;
initiate a second banking transaction based at least partially on the indication of the first banking transaction, wherein the second banking transaction involves at least a portion of the first information from the customer and at least the credit offer server, wherein initiating, by the credit offer server, the second banking transaction comprises:
applying pre-decision exclusion criteria to the portion of the first information from the customer, wherein the pre-decision exclusion criteria relates to one or more business exclusion rules that when satisfied by the portion of the first information automatically triggers the credit offer server to provide said first portion of the first information to a credit opportunity server that is external to the financial institution;
use the portion of the first information from the customer to thereby generate a second information;
provide the second information to the credit opportunity server that is external to the financial institution based at least partially on determining that the portion of the first information from the customer satisfies the pre-decision exclusion criteria;
a processing device configured to:
receive, at the financial institution from the credit opportunity server, one or more pre-approved credit offers based at least partially on a comparison of the second information to stored information, at the credit opportunity server, relating to a plurality of loans and the second information satisfying minimum criteria for eligibility for one or more of the plurality of loan products; and
present to the customer the one or more pre-approved credit offers.

25. The system of claim 24 further comprising an agent to format the credit offer inquiry for the credit opportunity service.

26. The system of claim 25 wherein the credit offer inquiry is formatted by the agent in extensible markup language.

27. The system of claim 26 wherein the offer server and the agent are disposed within a channel technology mid-tier.

28. The system of claim 25 wherein the offer server and the agent are disposed within a channel technology mid-tier.

\* \* \* \* \*